June 21, 1938.　　　　E. E. HEWITT　　　　2,121,543
FLUID PRESSURE BRAKE
Filed Nov. 6, 1936　　　　3 Sheets-Sheet 1
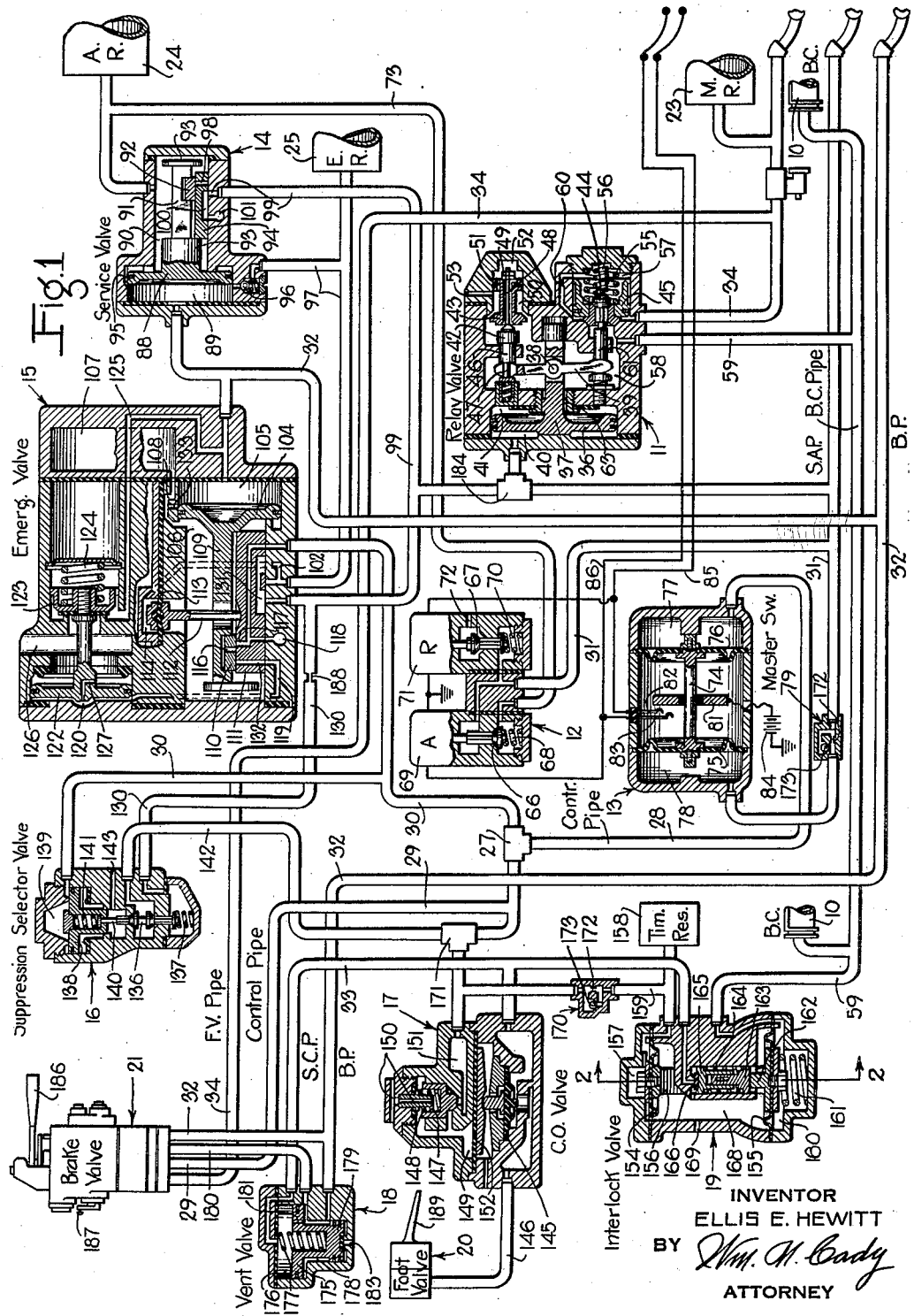
INVENTOR
ELLIS E. HEWITT
BY Wm. H. Cady
ATTORNEY

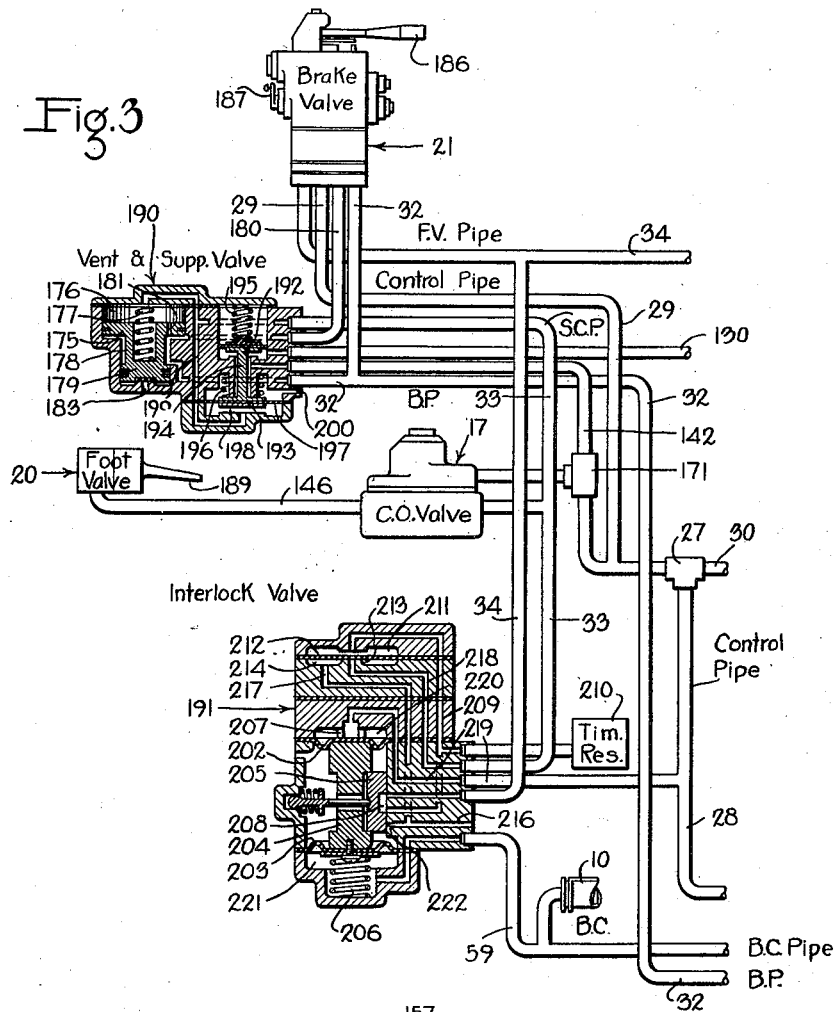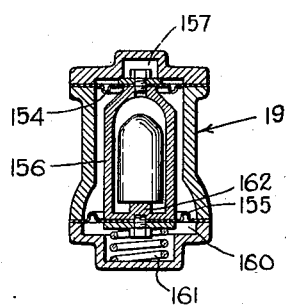

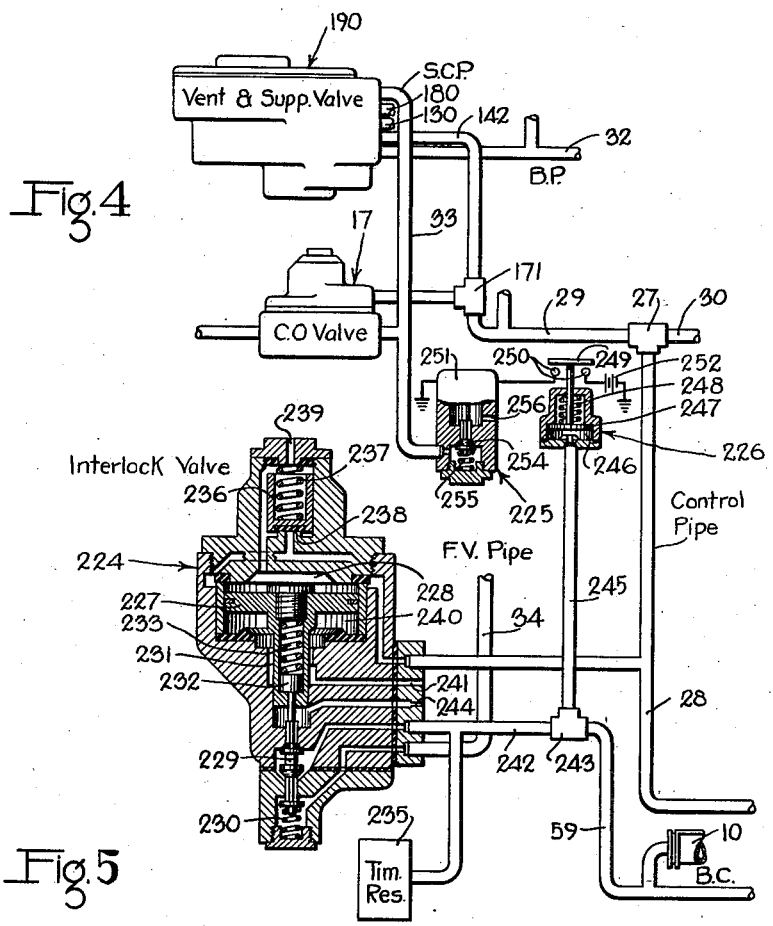

Patented June 21, 1938

2,121,543

UNITED STATES PATENT OFFICE 2,121,543

FLUID PRESSURE BRAKE

Ellis E. Hewitt, Edgewood, Pa., assignor to The Westinghouse Air Brake Company, Wilmerding, Pa., a corporation of Pennsylvania Application November 6, 1936, Serial No. 109,483

21 Claims. (Cl. 303—26)

This invention relates to fluid pressure brakes, and more particularly to fluid pressure brakes intended for high speed railway trains.

Safety is, of course, the guiding principle in the design of control equipment for railway trains. This is particularly true in the design of brake equipments for such trains, and becomes increasingly important when developing brake equipments for the new light-weight, high speed, passenger trains. The new light-weight, high speed, passenger trains are designed to operate at speeds in excess of one hundred miles per hour, and since a train traveling at one hundred miles per hour passes over a distance of approximately one hundred and forty-seven feet per second, it will be appreciated that it is essential that the brakes be applied with great rapidity, in order that the train may be stopped in the shortest possible time and distance.

In the brake equipments provided on the high speed passenger trains now in service, among other safety provisions is that for initiating and controlling applications of the brakes by more than one mode of operation, so that, in the event one control means should fail, another may be resorted to. Furthermore, provision has also been made in some of the brake equipments for automatically effecting an emergency application of the brakes in the event that a service application fails to materialize to a predetermined degree within a chosen length of time, following movement of the brake valve handle to a selected service application position. By this provision, an application of the brakes is virtually assured, so that the train may be decelerated with a minimum of delay. This last mentioned provision is in the nature of an insuring means, and, of course, adds greatly to the safety of handling the train.

The many problems encountered in the braking of the new high speed trains has given rise to the necessity of the employment of a large number of somewhat complicated devices. The addition of these devices to a brake equipment not only adds to its complication, but increases the cost of maintenance and, in some instances, also the liability of faulty operation. There is, therefore, a wide field for simplification and improvement in the various newly developed devices provided in the new brake equipments, so that not only will all of the functions essential to safety be retained, but also so that an increased degree of reliability, as well as a decreased first cost and cost of maintenance, will result.

With the foregoing considerations in mind, it is a principal object of the present invention to provide a brake equipment including a simplified and improved insuring means for insuring an application of the brakes in response to movement of the brake valve handle to a service application position.

A more specific object of the invention is to provide an improved valve mechanism which operates as the essential element in the insuring means.

A yet further object of the invention is to provide a brake equipment of the character aforesaid, in which an insuring means is provided to effect an emergency application of the brakes upon failure of a service application to materialize to a predetermined degree within a chosen length of time, following movement of the brake valve handle to service application position.

A yet more specific object of the invention is to provide a brake equipment in which service applications of the brakes are normally initiated by straight air operation and emergency applications by automatic operation, and in which upon failure of a straight air application to materialize to a predetermined degree within a chosen length of time, following movement of the brake valve handle to a service application position, then there is automatically effected an application by automatic operation.

Yet further and more specific objects of the invention, dealing with specific constructions and arrangements of parts, for generally carrying out the aforestated objects, will be more fully appreciated from the following description of several embodiments of my invention, taken in connection with the attached drawings, wherein, Fig. 1 shows in schematic and diagrammatic form a preferred embodiment of the invention as adapted to the head end or power car of a train.

Fig. 2 is a view taken along the line 2—2 of the application insuring or interlock valve device shown to the lower left of Fig. 1.

Fig. 3 shows in fragmentary form a modification of the brake equipment of Fig. 1, in which a different type of interlock or application insuring valve device is employed.

Fig. 4 shows also a modified form of the invention, in which the application insuring means involves the employment of a fluid pressure operated switch device.

Fig. 5 is still another modification employing yet another type of interlock or application insuring valve device in a yet different arrangement with a brake pipe vent valve device.

EMBODIMENT OF FIG. 1

Referring now to Fig. 1, the principal parts of the brake equipment there illustrated comprise one or more brake cylinders 10, a relay valve device 11 for controlling the supply of fluid under pressure to and its release from the brake cylinders, an application and release magnet valve device 12 for controlling the operation of the relay valve device, a master switch device 13 for controlling the operation of the application and release magnet valve device, a service valve device 14, an emergency valve device 15, a suppression selector valve device 16, a cut-off valve device 17, a brake pipe vent valve device 18, an interlock or application insuring valve device 19, a foot valve device 20, and a brake valve device 21. The various reservoirs supplied include a main reservoir 23, which is connected to the usual compressor (not shown), an auxiliary reservoir 24, an emergency reservoir 25, and a timing reservoir 158.

The various control pipes include a main control pipe 28 (having connected thereto, by way of a double check valve device 27, two branches 29 and 30), a straight air pipe 31, a brake pipe 32, a safety control pipe 33, and a feed valve pipe 34.

Considering now more in detail the devices above enumerated, the relay valve device 11 is embodied in a casing having disposed therein a piston 36 provided with a stem 37 carrying, pivotally mounted thereto at 38, a lever 39. The piston 36 is subject on one side to the pressure of fluid in a chamber 40 and on the other side to the pressure of fluid in a chamber 41.

When the piston 36 is actuated to the right, as by supply of fluid under pressure to the chamber 40, the lever 39 functions to first seat a release pilot valve 42, and then a main release valve 43, and after these two valves have been seated then functions to first unseat a supply pilot valve 44 and then a main supply valve 45. The release pilot valve 42 has a stem 46 provided with an intermediate reduced portion 47 disposed between the bifurcations forming the upper end of the lever 39. The release pilot valve 42 also has projecting to the right thereof a small stem 48, which stem projects through an aperture extending longitudinally of the main release valve 43 and has disposed on the end thereof nuts 49.

The main release valve 43 is slidable in a bore 50 in the valve device casing, and is provided with a restricted port 51 in the slidable portion of the body, so as to establish a restricted communication between a chamber 52 and an exhaust port 53.

The main supply valve 45 is urged toward a seated position by a spring 55, while the supply pilot valve 44 is urged toward a seated position within the main supply valve by a smaller spring 56. The supply valve 45 controls communication between the feed valve pipe 34 and a chamber 58 within the valve device, which chamber is connected to the brake cylinder 10 by way of brake cylinder pipe 59. The supply pilot valve 44 controls communication between a chamber 57, to the right of the main supply valve, and the aforementioned chamber 58. The chamber 57 is in communication with the feed valve pipe 34 by way of a passage containing a restriction 60.

When the piston 36 moves to the right, it will be obvious that, since the lever 39 engages the plunger 61, (which plunger is also in engagement with the spring-seated supply pilot valve 44) the lever 39 must actuate the release and supply valves in the sequence before stated.

Unseating of the pilot valve 44 releases fluid under pressure from the chamber 57 to the chamber 58, and thereby unloads the main supply valve 45 so that it may be readily unseated by the lever 39 with the applications of only a relatively light force.

When the main supply valve 45 is unseated, fluid under pressure will flow from the feed valve pipe 34 to the chamber 58, and from thence by way of pipe 59 to the two brake cylinders 10. From the chamber 58, fluid under pressure will also flow by way of passage 63 to the chamber 41, and when the pressure in this chamber is substantially equal to that in the chamber 40, the piston 36 will move to the left until the main supply valve 45 is seated by the spring 55, thus lapping the supply to the brake cylinders. It will be obvious, therefore, that the relay valve device will effect a brake cylinder pressure corresponding to the degree of fluid pressure established in the chamber 40, and will function to maintain the brake cylinder pressures accordingly, as is well understood by those familiar with the art.

When fluid under pressure is released from the piston chamber 40, the lever 39 rotates in a counter-clockwise direction to unseat the release pilot valve 42, thereby permitting fluid under pressure to flow from chamber 58 to chamber 52 and thus unload the main release valve 43, which may be then readily unseated upon further movement of lever 39. Fluid under pressure in chamber 58 will flow to the atmosphere via port 53, as will also that in chamber 52, in due time, via port 51.

The application and release magnet valve device is embodied in a casing comprising a supply valve 66 and a release valve 67. The supply valve 66 is urged toward seated position by a spring 68, and toward unseated position by an electromagnet 69 when energized. The release valve 67 is urged toward unseated position by a spring 70, and toward seated position by another electromagnet 71 when energized.

When the supply valve 66 is seated and the release valve 67 is unseated, as is illustrated, the straight air pipe 31 is in communication with the atmosphere by way of an exhaust port 72. When the release valve 67 is seated, and the supply valve 66 is unseated, fluid under pressure is supplied from the auxiliary reservoir to the straight air pipe 31, by way of pipe 73, and past the unseated supply valve 66.

The master switch device 13 controls the operation of the application and release magnet valve device 12. This switch device is embodied in a casing having suitably disposed therein, and connected by a stem 74, two diaphragms 75 and 76. The two diaphragms coact with the enclosing casing to define two pressure tight chambers 77 and 78, as illustrated. The chamber 77 is in open communication with the control pipe 28, while the chamber 78 is in open communication with the straight air pipe 31 by way of a choke and check valve device 79, to be described presently.

Carried by and insulated from the diaphragm stem 74 is an electrical contact 81. When moved to the left, this contact 81 is adapted to successively engage two stationary contacts 82 and 83, both of which are secured to and insulated from the casing of the switch device. The movable contact 81 is connected to one terminal of a battery 84, the other terminal of which is grounded as illustrated. The stationary contact 82 is connected to a release wire or conductor 85, which extends throughout the train and has connected thereto the release electromagnet 71 of each of the application and release magnet valve devices 12 throughout the train. The stationary contact 83 is connected to an application wire 86, which also extends throughout the train and connects to the application electromagnet 69 in each of the application and release magnet valve devices. As will be observed from Fig. 1, the other terminal of each of the electromagnets is connected to ground. It should be obvious, therefore, that, as the switch contact 81 engages the contact 82, the release electromagnet 71 will be energized, and, upon engagement with the stationary contact 83, the application electromagnet 69 will be deenergized.

The service valve device 14 is embodied in a casing containing a piston 88 subject on one side to the pressure of fluid in a chamber 89, and, on the other side, to the pressure of fluid in a slide valve chamber 90. The piston 88 is provided with a stem 91, which is recessed to receive and move coextensive therewith a slide valve 92. The stem 91 is also provided with shoulders or collars 93 for engaging, after a lost motion movement of the piston 88, a main slide valve 94.

The piston chamber 89 is connected to the brake pipe 32, while the slide valve chamber 90 is connected to the auxiliary reservoir 24. When the brake pipe 32 is charged, the piston 88 will be positioned as shown, in which position the auxiliary reservoir 24 is charged by way of a feed groove 95. At the same time, the emergency reservoir is charged from the brake pipe by way of a spring loaded check valve 96, the communication to the emergency reservoir including pipe 97.

Upon a service or emergency rate of reduction of pressure in the brake pipe 32, the overbalancing pressure of fluid in the slide valve chamber 90 will move the piston 88 the full distance to the left, cutting off communication between the brake pipe and both reservoirs 24 and 25. As the piston 88 moves to the left, the graduating valve 92 uncovers a port 98 in the main slide valve 94, and then shifts the main slide valve to a position where this port registers with a pipe and passage 99. Fluid under pressure may then flow from the auxiliary reservoir 24, and slide valve chamber 90, to the pipe 99. When the pressure in the slide valve chamber 90 drops slightly below the pressure in the chamber 89, the piston 88 will move to the right and cause the graduating valve 92 to lap the service port 98.

Upon a restoration of the pressure in the brake pipe 32, and chamber 89, the piston 88 will move the full distance to the right, and shift the two slide valves 92 and 94 to the illustrated position, in which position cavity 100 in the main slide valve connects the pipe 99 to an exhaust port 101.

The emergency valve device 15 comprises a piston 104 subject on one side to the pressure of fluid in a chamber 105, and on the other side to the pressure of fluid in a slide valve chamber 106 and a quick action chamber 107, the two latter chambers being connected by passage 108. The piston 104 is provided with a stem 109, which is recessed to receive and move coextensive therewith a graduating valve 110, and, as illustrated, is also adapted to move, after a lost motion movement of the piston 104, a main slide valve 111. The main slide valve is held upon its seat by a holding pin 112, which passes through an aperture in the stem 109 and projects into a recess in the main slide valve. The holding pin 112 is secured to a diaphragm 113, which, on its uppermost side, is subject to fluid under pressure in a chamber 114 connected to emergency reservoir pipe 97 by way of passage 102.

The piston chamber 105 is in open communication with the brake pipe 32. Upon a service rate of reduction in brake pipe pressure, the overbalancing pressure in the slide valve chamber 106 gradually shifts the piston 104 to the right until such time as a small port 116 in the graduating valve 110 registers with a port 117 in the main slide valve 111, which, in the release position, is in communication with an exhaust port 118. The size of the small port 116 is such that, when it registers with the main slide valve port 117, the pressure in the chamber 106, and consequently that in the quick action chamber 107, reduces at a rate such that the piston 104 is arrested in its movement to the right, and returned to the position illustrated when the pressure in chamber 105 slightly exceeds the diminished pressure in chamber 106. The purpose of this arrangement is to prevent the piston 104 from moving the extreme distance to the right, and thus shifting the main slide valve 111, when a service rate of reduction is effected in brake pipe pressure.

When, however, brake pipe pressure is reduced at an emergency rate, the differential of pressure acting on the piston is greater, and it moves more promptly to its extreme right hand position. When the piston moves the extreme distance to the right, the main slide valve 111 assumes a position in which a passage 119 is opened to the chamber 106. Fluid under pressure will then flow from the chamber 106, and quick action chamber 107, through the passage 119 to a piston chamber 120, where it will shift a piston 122 to the right to unseat a vent valve 123 against the bias of its spring 124. Unseating of the vent valve 123 will open communication between the brake pipe 32, adjacent the piston chamber 105, and the atmosphere, by way of passage 125, past the unseated valve 123, and atmospheric passage 126. This will result in completely venting the brake pipe. Ultimately, however, the pressure in the slide valve chamber 106 and the quick action chamber 107 will be reduced to atmospheric pressure by virtue of the escape of fluid through a small port 127 in the piston 122, whereupon the spring 124 will again seat the vent valve 123.

Also, when the main slide valve 111 is shifted to the right to application position, it connects pipe 97, leading to the emergency reservoir 25, with control pipe 30, so that fluid under pressure is supplied from the emergency reservoir to this pipe. This communication is effected by cavity 131 in the main slide valve 111. At the same time, communication between pipes 97 and 99 is not established.

To insure that the main slide valve 111 will be shifted to application position in response to an emergency rate of reduction in brake pipe pressure, an additional port 132 is provided in the main slide valve 111, and so arranged that when the piston 104 has moved sufficiently to the right for the graduating valve 110 to uncover this port, fluid under pressure may flow through it to the vent valve piston chamber 120, whereupon the unseating of the vent valve 123 will cause an immediate sharp drop in pressure in the chamber 105, and cause the piston 104 to promptly move the main slide valve to application position.

Upon a restoration of pressure in the brake pipe 32, and chamber 105, the piston 104 will move back to the illustrated position, where it will be noted that the cavity 131 in the main slide valve interrupts the communication between the emergency reservoir pipe 97 and the pipe 30, and where the main slide valve port 117 connects the pipe 30 to the exhaust port 118. Also, in release position of the piston 104, the slide valve chamber 106 and the quick action chamber 107 are both recharged by way of port 133.

The emergency valve device 15 has been illustrated in its simplest form, but it is to be understood that in practice I prefer to employ the corresponding type of valve device described and claimed in my copending application, Serial No. 741,063, filed August 23, 1934.

The suppression selector valve device 16 is embodied in a casing containing a double beat valve 136 urged toward an upper seated position by a spring 137, and adapted to be actuated to a lower seated position by a piston 138, in response to a supply of fluid under pressure to a chamber 139. The piston 138 is provided with a hollow stem containing a plunger 140 urged downwardly by a spring 141. When fluid under pressure is supplied to the chamber 139, the piston 138 moves downwardly and the plunger 140 moves the stem of double beat valve 136 to shift the double beat valve to lower seated position.

When the double beat valve 136 is in the upper seated position, as illustrated, communication is established between the aforementioned pipe 130 and another pipe 142. When the double beat valve is shifted to lower seated position, this communication is cut off and the pipe 142 is connected to the atmosphere by way of an exhaust port 143.

The cut off valve device 17 is embodied in a casing provided with a valve 145 for controlling communication between the safety control pipe 33 and a branch pipe 146 leading to the foot valve device 20. Disposed in the upper part of the valve device is a small supply controlling valve 147, urged toward seated position by a spring 148. When in seated position, the valve 147 opens communication between a chamber 149 and the atmosphere by way of port 150. However, upon supply of fluid under pressure to a supply chamber 151, the pressure of this fluid will at a predetermined value act upon the exposed surface of the valve 147 and shift it to upper seated position, where it closes communication between the chamber 149 and the atmosphere, and opens communication between the two chambers 151 and 149. Fluid under pressure may then flow from the chamber 151 to the chamber 149, and therein act upon a diaphragm 152 to urge it downwardly to seat the valve 145, thus closing communication between the safety control pipe 33 and the branch pipe 146 leading to the foot valve.

Upon a release of fluid under pressure supplied to the chamber 151, the valve 147 will, of course, be seated by its spring 148, and again open communication between the chamber 149 and the atmosphere, whereupon the valve 145 will unseat itself due to the resiliency of the material of which it is made.

The interlock or application insuring valve device 19 is embodied in a casing having disposed therein in spaced relationship two diaphragms 154 and 155. These two diaphragms are connected by a yoke shaped member 156, as is clearly shown in Fig. 2. The diaphragm 154 defines with the valve device casing a chamber 157 thereabove, which chamber is in open communication with timing reservoir 158 by way of pipe 159.

The diaphragm 155 defines with the valve device casing a chamber 160 therebelow, which is in open communication with the brake cylinder pipe 59. Disposed in the chamber 160 is a spring 161, which acts to urge the diaphragm 155 upwardly.

As will be observed from the arrangement shown, the area of the diaphragm 155 exposed to the chamber 160 is greater than the area of the diaphragm 154 exposed to the chamber 157. Moreover, since the spring 161 acts to assist the pressure of fluid in the chamber 160 to urge the diaphragm 155 upwardly, it follows that a low fluid pressure in the chamber 160 will balance a high fluid pressure in the chamber 157.

Attached to the follower plate connected to the diaphragm 155 is a stem 162, which acts through a member 163 and spring 164 to hold a valve 165 in seated position. The valve 165 rests, when in seated position, upon an annular seat rib 166, the area of the valve within the annular seat rib 166 being exposed to fluid pressure in the safety control pipe 33, as illustrated.

When the diaphragm 155 is moved downwardly so as to release the spring pressure holding the valve 165 upon its seat, the pressure of fluid acting upon the inner area of the valve 165 will unseat it to permit fluid under pressure to flow from the safety control pipe 33 to the atmosphere, by way of chamber 168 between the two diaphragms 154 and 155, and port 169. The valve 165 is, however, normally held in seated position when the safety control pipe is charged, by virtue of the spring 161 acting upwardly on the diaphragm 155.

The timing reservoir 158 is in communication with the branch 29 of the control pipe 28, by way of a choke and check valve device 170 and a double check valve device 171. The choke and check valve device 170, and the aforementioned choke and check valve device 79, are preferably of similar design, each comprising a choke or restricted passage 172, which provides a restricted communication both ways through the valve device, and a ball check valve device 173, which provides an unrestricted one-way communication through the valve device.

The vent valve device 18 comprises a piston 175 subject on its uppermost side to the pressure of fluid in a chamber 176, and also to the pressure of a spring 177, and on its lowermost side to the pressure of fluid in a chamber 178. Attached to the piston 175 is a vent valve 179, which is held seated when the piston 175 is in the lowermost position, as illustrated.

The chamber 176 is in open communication with the safety control pipe 33, while the chamber 178 is in open communication with a charging pipe 180 leading to the brake valve device 21. When the brake system is charged, the pressure in the safety control pipe 33, and that in the charging pipe 180, will be substantially the same, due to the charging communication afforded by the small port 181 in piston 175. The piston 175 will, therefore, be held in its lowermost position by spring 177, as illustrated, and the small port 181 in the piston will maintain the safety control pipe pressure and the charging pipe pressure equalized. Further, for this position of the piston, the charging pipe 180 and the brake pipe 32 will be in open communication.

Upon a reduction of pressure in the safety control pipe 33, the overbalancing pressure in the chamber 178 will shift the piston 175 upwardly and thus unseat the vent valve 179. In moving upward, the vent valve closes communication between the charging pipe 180 and the brake pipe 32, and vents the brake pipe to the atmosphere by way of port 183. The port 181 is too small to admit of rapid enough flow from the charging pipe 180 to chamber 176 to prevent this.

It will be observed that disposed between the portion of the straight air pipe 31 adjacent the relay valve device 11, and the aforementioned pipe 99 is a double check valve device 184. This check valve device, as well as the check valve devices 27 and 171 hereinbefore referred to, are preferably of the same conventional design, and for that reason have not been illustrated in section.

The brake valve device 21 is preferably the same as, or similar to, that described and claimed in my copending application, Serial No. 105,659, filed October 15, 1936. It is not essential to the understanding of the present invention that this brake valve device be either fully shown or described in detail, and for that reason I have elected to refer only to those functions of the brake valve device essential to an understanding of the operation of the brake equipment illustrated.

The brake valve device 21 is preferably operated by movement of a handle 186 in a single application zone, to control all applications of the brakes. In order to accomplish this, the brake valve is provided with a selector 187, which, in one of its two positions, conditions the brake valve for controlling the brakes by straight air operation, and which, in the other of its two positions, conditions the brake valve to control the brakes by automatic operation.

When the selector 187 is in the straight air position, and the handle 186 is in release position, the control pipe branch 29 is in communication with the atmosphere, while the brake pipe 32 is maintained charged from the feed valve pipe 34, by way of the charging pipe 180 and the vent valve device 18. When the selector 187 is in straight air position, an application of the brakes is effected by moving the handle 186 to any desired position into the application zone, whereupon communication between the control pipe branch 29 and the atmosphere is closed, and fluid under pressure is supplied to this control pipe branch to a degree dependent upon the degree of movement of the handle 186 into the application zone. During this movement of the handle 186, the brake pipe 32 continues to be maintained charged by the brake valve device.

When the selector 187 is in the automatic position, and the handle 186 is in the release position, the control pipe branch 29 will be connected to the atmosphere and the brake pipe charged, as before described. When it is desired to effect an automatic application of the brakes, the handle 186 is first moved to a first service, or slack-gathering, position, in the case of long trains, and then to the full service position; or, if the train is short, it may be moved to the full service position in the first instance. In the first service position of the handle, a small reduction in brake pipe pressure results, and in the full service position brake pipe pressure will continue to be reduced at a service rate until the handle is turned to the lap position. The degree of reduction in brake pipe pressure is thus controlled according to the time in which the handle 186 remains in the full service position. During this manipulation of the handle, the control pipe branch 29 continues to be connected to the atmosphere.

Regardless of what position the selector 187 is in, if the handle 186 is turned to the emergency position the brake pipe 32 will be vented to the atmosphere directly, by the operation of a separate valve within the brake valve device.

The complete functioning of the brake valve device 21, together with a full description of the complete structure, are fully covered in my above referred to copending application.

OPERATION OF THE EMBODIMENT OF FIG. 1

*(a) Charging of the equipment*

At all times while the train is running under power, or coasting, the brake valve handle 186 is maintained in release position, and pressure is manually applied to a foot pedal 189 of the foot valve device 20. As before described, when the handle 186 is in release position the control pipe 28 and its branch 29 will be maintained in communication with the atmosphere, while the brake pipe 32 will be maintained charged to the desired pressure. The safety control pipe 33 will also be maintained charged by way of the small port 181 in the piston 175 of the vent valve device 18.

The auxiliary reservoir 24 will be charged from the brake pipe by way of the feed groove 95 in the service valve device 14, and the emergency reservoir 25 will be charged by way of the ball check valve device 96 in the same valve device. In the emergency valve device 15, the quick action chamber 107 and the slide valve chamber 106 will be maintained charged from the brake pipe by way of port 133 and passage 108. The parts will then be in the positions as illustrated.

*(b) Straight air service application*

Assuming now that it is desired to effect a straight air service application of the brakes, the selector 187 on the brake valve device is turned to the straight air position. The operator then turns the handle 186 to a position in the application zone dependent upon the desired degree of application of the brakes. Fluid under pressure will be then supplied to the control pipe 28 and its branch 29 to a degree dependent upon brake valve handle position, the double check valve 27 opening communication between the pipes 28 and 29.

Fluid under pressure in the control pipe 28 flows to the chamber 77 in the master switch device 13, and the pressure of this fluid actuates the two diaphragms 75 and 76, together with the connecting stem 74, to the left. The contact 81 first engages stationary contact 82 and then the stationary contact 83, to successively energize the release electromagnet 71 and the application electromagnet 69, in the application and release magnet valve device 12. As a result, the release valve 67 will be seated and the supply valve 66 will be unseated, to supply fluid under pressure from the auxiliary reservoir 24 to the straight air pipe 31, by way of pipe 73, past the unseated supply valve 66, and the passage connecting with the straight air pipe.

Fluid under pressure in the straight air pipe 31 flows to the double check valve device 184, shifting the valve therein to its upper position, and from thence flows to the piston chamber 40, of the relay valve device 11. The relay valve device 11 then functions, as previously described, to supply fluid under pressure from the feed valve pipe 34 to the brake cylinder pipe 59, to a degree according to the degree of fluid pressure established in the straight air pipe.

Fluid under pressure in the straight air pipe 31 also flows to the chamber 78 in the master switch device 13, by way of restricted passage 172 in the choke and check valve device 79, and when the pressure of this fluid is substantially equal to the pressure of the fluid in the chamber 77, the two diaphragms 75 and 76 will move to the right until the contact 81 disengages from the stationary contact 83, but retains engagement with the stationary contact 82. The application electromagnet 69 will then be deenergized and spring 68 will seat the supply valve 66. As a result, the supply of fluid under pressure to the straight air pipe 31 will be lapped, and the relay valve device 11 will lap the supply to the brake cylinder pipe 59 leading to the brake cylinders 10. The degree of application of the brakes will then correspond to the brake valve handle position.

Fluid under pressure supplied to the branch 29 of the control pipe will also flow to the double check valve device 171, shifting the valve therein to its upper position, and then flows to the chamber 151 in the cut-off valve device 17, and also to the timing reservoir 158 and chamber 157 in the interlock or application insuring valve device 19, this latter flow passing through the restricted passageway 172 in the check and choke valve device 170.

In the chamber 151 of the cut-off valve device, the pressure will increase substantially as rapidly as that in the control pipe 28, and when it has reached a predetermined value will shift the valve 147 to its upper seated position, and fluid under pressure will flow to the chamber 149, where it will actuate the diaphragm 152 downwardly to seat the valve 145. That is to say, after a predetermined degree of pressure has been established in the chamber 151, the valve 145 will be seated and the operator may thereafter remove pressure from the foot pedal 189 of the foot valve device 20, without venting the safety control pipe 33.

The presence of the restricted passageway, or choke, 172 and the timing reservoir 158 in, or associated with, the communication to the chamber 157, in the interlock valve device, is for the purpose of causing the elapse of a predetermined interval of time before a certain critical pressure has been established in the chamber 157. When this critical pressure has been established in the chamber 157, the diaphragms 154 and 155 will be actuated downwardly, unless in the meanwhile a counterbalancing pressure has been established in the chamber 160 sufficient to hold the diaphragms in the position illustrated.

Since the chamber 160 is connected to the brake cylinder pipe 59, it follows that the rise of pressure in this chamber will correspond to the rise of pressure in the brake cylinders 10, and if the brake cylinder pressure does not rise to a value sufficient to counterbalance the pressure in chamber 157, within the time established by the presence of the choke 172 and timing reservoir 158, the diaphragms 154 and 155 will be actuated downwardly, to effect the unseating of the vent valve 165. This will, of course, result in venting the safety control pipe 33, to effect an automatic emergency application of the brakes, as will be understood more clearly later. The interlock or application insuring valve device 19, the timing reservoir 158 and check and choke valve device 170, therefore, time and measure the degree of application of the brakes effected during straight air operation, and in the event that the desired degree does not materialize within a predetermined or critical interval of time, function to effect an automatic emergency application of the brakes.

During the foregoing operation, the brake pipe 32 is maintained charged, and the service valve device 14 and emergency valve device 15 do not operate, except, of course, in the event that the interlock valve device 19 operates.

To release the brakes following a straight air application, the brake valve handle 186 is returned to the release position, whereupon the control pipe 28—29 will be vented to the atmosphere. Diaphragms 75 and 76 in the master switch device 13 will then move to the illustrated position, causing deenergization of both the application electromagnet 69 and release electromagnet 71. This will result in venting the straight air pipe 31 to the atmosphere, causing the relay valve device 11 to also operate to vent the brake cylinder pipe 59 and brake cylinders 10 to the atmosphere.

While specific reference has not been made at this time to the operation of the relay valve device 11, it will be apparent from a consideration of the detailed description given hereinbefore, that, due to the arrangement and design of the parts illustrated, the relay valve device will function promptly and with a high degree of sensitivity in response to variations of pressure in the straight air pipe 31.

(c) Automatic service application

To effect an automatic service application of the brakes, the selector 187 on the brake valve device 21 is turned to the automatic position. Assuming now a short train, the brake valve handle 186 is turned to the full service position and left there until a suitable reduction in brake pipe pressure has been made, and thereafter turned to the lap position. The reduction in brake pipe pressure which takes place occurs at a service rate, so that only the parts of the service valve device 14 move to application position, the emergency valve device 15 being unresponsive to a service rate of reduction in brake pipe pressure to effect an application of the brakes, as previously described.

In the service valve device 14, however, piston 88 moves the full distance to the left, bringing the main slide valve port 98 into registration with the pipe and passage 99. Fluid under pressure will then flow from the slide valve chamber 90, and the auxiliary reservoir 24, to the pipe 99. From the pipe 99, fluid under pressure will flow to the double check valve device 184, shifting the valve therein to its lower position, and will then flow to the relay piston chamber 40. The relay valve device will then respond as before to effect a corresponding supply of fluid under pressure to the brake cylinder pipe 59. The supply of fluid under pressure to the pipe 99 will, of course, be lapped when the degree of pressure in the pipe corresponds substantially to the degree of brake pipe reduction.

From the pipe 99, fluid under pressure also flows to the connected pipe 130, which contains therein a choke 188. From the pipe 130, fluid under pressure flows past the open lower seat of the double beat valve 136 in the suppression selector valve device 16, and pipe 142, to the double check valve device 171, shifting the valve therein to the lower position, and then flowing to the chamber 151 in the cut-off valve device 17, and to the timing reservoir 158 and chamber 157 of the interlock valve device 19.

It will thus be seen that, during an automatic service application of the brakes, fluid under pressure is supplied to the cut-off valve chamber 151 and interlock valve chamber 157, just as it was during a straight air service application of the brakes.

The interlock or application insuring valve device 19, therefore, times and checks the degree of application of the brakes effected by operation of the service valve device 14, and if sufficient brake cylinder pressure is established during the interval of time while the pressure in the chamber 157 is rising to a critical or predetermined degree, then the parts of the interlock valve device remain in the position illustrated; but if the desired brake cylinder pressure should not materialize, then the parts of the interlock valve device function to vent the safety control pipe 33 to effect an emergency application.

To effect a release of the brakes following an automatic service application, the brake valve handle 186 is again returned to release position, whereupon the brake pipe 32 will be recharged from the feed valve pipe 34. Recharging of the brake pipe causes the parts of the service valve device 14 to assume the release position as illustrated, whereupon the pipe 99 will be vented to the atmosphere by way of cavity 100 in the main slide valve 94, and exhaust port 101. This will, of course, result in the relay valve device 11 releasing fluid under pressure from the brake cylinders 10.

(d) *Emergency application*

An emergency application of the brakes may result from either of three operations. The first of these, and the one which is most concerned with the present invention, is by operation of the interlock or application insuring valve device 19; the second is by operation of the brake valve handle 186 to emergency position; and the third by release of pressure manually applied to the foot pedal 189 of the foot valve device 20, i. e., a safety control emergency application.

Considering now the operation of the interlock or application insuring valve device 19, as has been previously described if the pressure of fluid supplied to the chamber 157 should rise to a predetermined or critical value before sufficient brake cylinder pressure has been established in the chamber 160 to prevent downward movement of the two diaphragms 154 and 155, then the resulting downward movement of these two diaphragms will effect the unseating of the vent valve 165. This will, of course, rapidly vent the safety control pipe 33, and as a result the overbalancing pressure in the chamber 176 of the vent valve device 18 will shift the piston 175 therein upwardly, first closing communication between the brake pipe 32 and the charging pipe 180, and then venting the brake pipe to the atmosphere by way of the large exhaust port 183.

The reduction in brake pipe pressure which takes place is at an emergency rate, so that the emergency valve device 15, as well as the service valve device 14, respond. The piston 104 in the emergency valve device 15 will move to its extreme right hand position, at the same time causing unseating of the vent valve 123 to further reduce brake pipe pressure, and also connecting the emergency reservoir 25 to the pipe 30, thus supplying fluid under pressure to the pipe 30 while blanking communication to the pipe 99. The supply to the pipe 30 is by way of pipe 97, cavity 131 in the main slide valve 111, and the passage connecting with pipe 30. Since the pipe 30 is a branch of the control pipe 28, it will be obvious that the supply of fluid under pressure to the control pipe will effect the operation of the master switch device 13, to cause the application and release magnet valve device 12 to supply fluid under pressure to the straight air pipe 31.

Since the service valve device 14 effects a supply of fluid under pressure to the pipe 99, it will be apparent that the double check valve device 184 will select between the pressure of fluid in the pipe 99 and that in the straight air pipe 31. The service port 98 in the service valve device 14 is a relatively small port, so that the build up of pressure in the pipe 99 takes place at a slower rate than the build up of pressure in the straight air pipe 31, and as a consequence, the double check valve device will open communication between the straight air pipe 31 and the relay piston chamber 40.

Further, the emergency reservoir 25 is preferably made larger than the auxiliary reservoir 24, so that it will deliver fluid at a higher ultimate pressure.

In the event, however, that the application and release magnet valve device 12 should fail to function, the double check valve device 184 will open communication between the pipe 99 and the relay piston chamber 40. In any event, the relay valve device 11 will respond to the pressure of fluid supplied to the chamber 40 to effect an application of the brakes. The volume of the emergency reservoir 25 is further made sufficient so that, when the pressure established in the control pipe 28 is due to flow from it, the pressure will be a maximum, thereby causing a maximum degree of application of the brakes.

Fluid under pressure supplied to the branch control pipe 30 flows to the chamber 139 in the suppression selector valve device 16, and the pressure of fluid in this chamber shifts the piston 138 downwardly and thereby actuates the double beat valve 136 to lower seated position. This places the pipe 142 in communication with the exhaust port 143, so that fluid under pressure cannot be supplied to the cut-off valve chamber 151 and the interlock valve chamber 157 as a result of supply of fluid under pressure to the pipe 99. The reason for interrupting communication between the pipes 139 and 142 will be clear later.

From the foregoing, it will be clear that, upon failure of a service application of the brakes to materialize to a predetermined degree in a chosen length of time, the interlock or application insuring valve device 19 will function to effect an emergency application of the brakes, so that the train will be stopped promptly and without delay.

Considering now initiating an emergency application of the brakes by turning the brake valve handle 186 to an emergency position, this unseats a special valve responsive only to movement of the handle to emergency position, to vent the brake pipe 32 at an emergency rate. This, of course, results in an emergency application effected in substantially the same manner as just described for the first type of emergency application.

When the brake valve handle 186 is moved to emergency position at a time when the selector 187 is in the straight air position, fluid under pressure will be supplied to the control pipe branch 29, but the pressure of this supply will be lower than that supplied to the branch 30 by the emergency valve device 15, so that the double check valve device 27 will open communication between the branch 30 and the main control pipe 28.

To release the brakes following this type of emergency application, the brake valve handle 186 is returned to release position, where the brake pipe is recharged, and the parts in the service valve device 14 and emergency valve device 15 are as a result returned to the illustrated position, to effect the release.

Considering now the third method of effecting an emergency application; that is, by release of pressure manually applied to the foot pedal 189, this results in venting the safety control pipe 33, whereupon the vent valve device 18 functions to vent the brake pipe to the atmosphere at an emergency rate. It will be seen that each of the methods for effecting an emergency application results in venting the brake pipe to the atmosphere at an emergency rate, so that the resulting operation of parts is substantially the same.

In each of the types of emergency applications described, the suppression selector valve device 16 closes communication between the pipe 142 and the pipe 130, but this is of significance only with respect to the last mentioned, or safety control, emergency application. If fluid under pressure is supplied to the cutoff valve chamber 151 while the foot valve 20 is venting the safety control pipe, the valve 145 will be seated and permit the safety control pipe to be recharged by way of port 181 in the vent valve piston 175, thus possibly causing an undesired release of the brakes. By interrupting the communication between pipes 130 and 142 this is prevented.

EMBODIMENT OF FIG. 3

The embodiment of Fig. 3 is intended to show only so much of the brake system illustrated in Fig. 1 as is necessary to indicate the extent of the modifications made. These modifications comprise the employment of a combination vent and suppression valve device 190, substituted for both the vent valve device 18 and the suppression selector valve device 16 of Fig. 1, and also the employment of a different type interlock or application insuring valve device 191 for the corresponding interlock valve device 19 of Fig. 1.

The vent valve portion of the combination vent and suppression valve device 190 comprises essentially the parts of the aforedescribed vent valve device 18, which parts are indicated by like numerals, while the suppression valve portion comprises a supply valve 192 and a release valve 193 connected together by a stem 194. Two springs 195 and 196 urge the supply valve 192 toward seated position and the release valve 193 toward unseated position.

A diaphragm 197, having one side thereof exposed to a chamber 198 connected to the safety control pipe 33 by way of passage 199, functions when the safety control pipe is charged to maintain the release valve 193 seated and the supply valve 192 unseated. For this position of the two valves, the aforementioned pipe 130 is connected to the aforementioned pipe 142. When the safety control pipe pressure decreases below a predetermined value, the two springs 195 and 196 function to seat the supply valve 192, to close communication between the two pipes 130 and 142, and to unseat the release valve 193, to vent the pipe 142 to the atmosphere by way of exhaust port 200.

The interlock valve device 191 comprises two diaphragms 202 and 203 connected by a stem 204, the latter diaphragm being larger than the former and the stem being recessed to receive and move coextensive with movement thereof a slide valve 205.

A spring 206 acts upon the lower diaphragm 203 to position the parts as illustrated, whereupon the diaphragm 202 is held in contact with stops 207. For this position of the slide valve 205, feed valve pipe 34 is connected by cavity 208 in the slide valve to a passage 209, which passage leads to a timing reservoir 210 and to a chamber 211 to one side of a diaphragm valve 212. The diaphragm valve 212 is adapted to engage an annular seat rib 213, to close communication between a chamber 214, which is in communication with an atmospheric port 216 by way of passage 217, and a passage 218 connecting with the safety control pipe 33.

Chamber 220 above the smaller diaphragm 202 is connected by pipe and passage 219 to the control pipe 28, while chamber 221 below the larger diaphragm 203 is connected to the brake cylinder pipe 59.

In the operation of the brake equipment, with the brake valve handle 186 in release position, and the brake pipe 32 fully charged, the parts of the two valve devices 190 and 191 will be in the positions as illustrated. In the interlock or application insuring valve device 191, it will be noted that the timing reservoir 210 is charged from the feed valve pipe 34.

When now a straight air application of the brakes is effected, fluid under pressure supplied to the control pipe 28 will flow to chamber 220 and when the pressure in this chamber has reached a certain degree, the diaphragms 202 and 203 will be actuated downwardly against opposition of spring 206. The cavity 208 in the slide valve 205 will then disconnect the passage 209 from the feed valve pipe 34 and connect passage 209 to the atmospheric passage 216. This will, of course, vent the timing reservoir 210 and the chamber 211 to the atmosphere.

However, this venting will take place at a slow rate due to the presence of the restriction 222 in the passage 216 at the seat of the slide valve 205. If the slide valve 205 is permitted to remain in this lower position until the pressure of the timing reservoir 210 and the chamber 211 is permitted to fall below a predetermined value, then the pressure acting below the diaphragm valve 212, due to the connection with the safety control pipe 33, will unseat the diaphragm valve and vent the safety control pipe to the atmosphere, by way of chamber 214, passage 217 and atmospheric port 216. Safety control pipe pressure will be reduced at an emergency rate, so that the vent valve 179 of the vent and suppression valve device 190 will be operated to vent the brake pipe to the atmosphere at an emergency rate, to thus effect an emergency application of the brakes.

However, if the brake cylinder pressure materializes to the desired degree before the pressure in the timing reservoir 210 has been reduced below the said predetermined value, then brake cylinder pressure acting on the larger diaphragm 203, together with the pressure of the spring 206, will shift the slide valve 205 to its upper position, thus terminating the venting of the timing reservoir 210, and again connecting it to the feed valve pipe 34. It will thus be seen that the interlock or application insuring valve device 191, while of different construction and operating in somewhat different manner from the like valve device 19 of Fig. 1, performs substantially the same function.

Considering now the vent and suppression valve device 190, it will be observed that the parts of this valve device will remain in the position illustrated until the safety control pipe 33 is vented to the atmosphere, or the pressure therein substantially reduced. When the pressure in the safety control pipe 33 is reduced, the piston 175 will move upwardly to vent the brake pipe to the atmosphere, while the two springs 195 and 196 will shift the supply valve 192 to seated position and release valve 193 to unseated position. The effect of shifting the supply valve 192 to seated position and the release valve 193 to unseated position is to prevent during a safety control emergency application any tendency of the emergency application to release itself, as described in connection with the embodiment of Fig. 1.

It will be apparent from a consideration of the description of the embodiment of Fig. 3 thus given, that the new valve devices provided may be used with the complete brake system of Fig. 1 without impairing any of the functions of that system.

EMBODIMENT OF FIG. 4

The embodiment of Fig. 4 illustrates an arrangement whereby an interlock or application insuring valve device 224, together with a magnet valve device 225 and a switch device 226, are substituted for the previously considered interlock or application insuring valve devices. The other parts of this embodiment correspond to the parts shown in the embodiment of Fig. 3, and are similarly connected in the brake system of Fig. 1.

The interlock valve device 224 comprises a piston 227 operable upon supply of fluid under pressure to a chamber 228 to move downwardly to shift a double beat valve 229 from upper seated position to lower seated position, against the bias of spring 230. The piston 227 is provided with a hollow stem 231 having disposed therein a plunger 232 urged downwardly by a spring 233, the plunger 232 engaging the fluted stem of the double beat valve 229 to shift it from upper seated position to lower seated position.

When fluid under pressure is released from the chamber 228, spring 230 moves the piston 227 upwardly and at the same time shifts the double beat valve 229 from lower seated position to upper seated position.

Fluid under pressure is supplied to the chamber 228 from the control pipe 28 by way of a valve 236, which is urged toward a lower seated position by a spring 237. The valve 236 is normally maintained seated on an annular seat rib 238, and the area of the valve within the seat is exposed to the pressure of fluid in the pipe 28. When this pressure exceeds a predetermined value, the valve 236 will be actuated to upper seated position, closing communication between the chamber 228 and exhaust port 239, and opening communication between the chamber 228 and the pipe 28.

The chamber 240 below the piston 227 is in open communication with the atmosphere by way of passage 241, so that, when the piston is actuated downwardly due to fluid pressure in the chamber 228, it will be held in its lowermost position.

When the double beat valve 229 is in upper seated position, communication is established between the feed valve pipe 34 and pipe 242 leading to timing reservoir 235 and to double check valve device 243. When the double beat valve 229 is in lower seated position, this communication is cut off and the pipe 242 is connected to an atmospheric port containing a restriction 244.

The double check valve device 243 is of conventional design, and whereas one inlet communication is connected to the pipe 242 the other inlet communication is connected to the brake cylinder pipe 59. The outlet communication is connected to pipe 245 leading to a chamber 246 of the switch device 226.

The switch device 226 is embodied in a casing containing a piston 247 subject on its lowermost side to the pressure of fluid in the chamber 246, and on its uppermost side to the pressure of a spring 248. When the piston 247 is in the uppermost position, a bridging contact 249, carried by and insulated from the piston stem, disengages from two stationary contacts 250. When the piston is in its lowermost position, the contact 249 engages and bridges the two contacts 250.

The contacts 249 and 250 control the energization of an electromagnet 251 in the magnet valve device 225, current being supplied from a battery 252.

The magnet valve device 225 contains a supply valve 254 urged toward a seated position by a spring 255, and toward an unseated position by the electromagnet 251 when energized. When the valve 254 is unseated, communication is established between the safety control pipe 33 and an exhaust port 256, and when the valve 254 is seated this communication is cut off.

In operation of the brake system comprising the apparatus of Fig. 4, fluid under pressure supplied to the control pipe 28 flows to the seat of the valve 236, and when the value of this pressure reaches the aforesaid predetermined unseating value, the valve unseats and permits fluid under pressure to flow to the piston chamber 228. The piston 227 is thereupon actuated downwardly to shift the double beat valve 229 from upper seated position to lower seated position. It will be observed that, in the upper seated position of the double beat valve 229, timing reservoir 235 is charged from the feed valve pipe 34. Therefore, when the double beat valve shifts to lower seated position, the timing reservoir 235 is connected to the atmospheric port containing the restriction 244.

So long as the timing reservoir 258 is charged above a predetermined degree, the switch device 226 will maintain the contact 249 disengaged from the contacts 250. When, however, the pressure in the timing reservoir, and consequently that in the chamber 246 of the switch device 26, diminishes below the said predetermined closing value, the contact 249 will engage the contacts 250, to energize the electromagnet 251. This will unseat the valve 254 and vent the safety control pipe 33 to the atmosphere, resulting in an emergency application of the brakes as before described.

If, however, before the pressure in the timing reservoir 235 and chamber 246 has diminished below the aforesaid predetermined closing value, the pressure in the brake cylinders 10 should reach a value exceeding timing reservoir pressure, the valve in the double check valve 243 will shift to the left and open communication between the brake cylinder pipe 59 and the pipe 245. Brake cylinder pressure will thereafter be effective in maintaining the switch contact 249 disengaged from the contacts 250, thereby preventing an emergency application.

It will thus been seen that an emergency application will be effected upon a failure of brake cylinder pressure to be developed to a predetermined degree within a chosen length of time, following initiation of a service application of the brakes.

MODIFICATION OF FIG. 5

The embodiment shown in this figure differs from the previous embodiments essentially in the employment of a different type of interlock valve device, designated at 260, and a different type of vent valve device, indicated at 261.

The interlock or application insuring valve device 260 is embodied in a casing containing a piston 262, subject on one side to pressure of fluid in a chamber 263, and also to the pressure of a spring 264, and subject on the other side to the pressure of fluid in a chamber 265. The chamber 263 is connected to the brake cylinder pipe 59, while the chamber 265 is connected by way of pipe 266 to a timing reservoir 267, and by way of a check and choke valve device 268 (which is of the same design as those heretofore described), to the control pipe 28, so that fluid under pressure supplied to the control pipe will flow to both the timing reservoir 267 and the chamber 265.

The piston 262 is provided with a stem 269, which is recessed to receive and move coextensive therewith a slide valve 270. The slide valve is held upon its seat by a pin 271 urged downwardly by a spring 272.

When the piston 262 is in the position illustrated, a cavity 273 in the slide valve connects a pipe and passage 275 to an exhaust port 276. When the piston 262 is moved to the left, this communication is cut off and pipe and passage 275 is opened to the chamber 265.

The vent valve device 261 contains a piston 277 which is operated upon supply of fluid under pressure to the pipe 275 to unseat a vent valve 278 against the bias of a spring 279. Unseating of the vent valve 278 opens a communication between the brake pipe 32 and the atmosphere, by way of port 280, to vent the brake pipe to the atmosphere at an emergency rate.

In the operation of the apparatus illustrated in Fig. 5, when fluid under pressure is supplied to the control pipe 28, it flows by way of the restriction 172 in the valve 268 to the timing reservoir 267 and to the chamber 265. It will be observed that the piston 262 seats upon a seat rib 281 when in its right hand position, so that the area of the piston exposed to the chamber 265 is less than the area exposed to the chamber 263. Due to the presence of the choke 172 and timing reservoir 267, a predetermined interval of time will elapse before sufficient pressure is built up in the chamber 265, and timing reservoir 267, to shift the piston from its seat 281, but when it once disengages from the seat it will move promptly to the left, due to the increased area exposed to the pressure in chamber 265.

If, however, before the piston 262 disengages from seat 281, brake cylinder pressure has built up sufficiently, the piston 262 will be held in its right hand position although the pressure in chamber 265 reaches its maximum value, because the area of the piston exposed to brake cylinder pressure is greater than that exposed to the pressure in chamber 265. On the other hand, if sufficient brake cylinder pressure fails to materialize within said predetermined length of time, the overbalancing pressure from the chamber 265 will shift the piston 262 to its left hand position, and fluid under pressure will be supplied to the vent valve device to effect unseating of the valve 278. This will, as before described, vent the brake pipe to the atmosphere at an emergency rate to effect an emergency application of the brakes.

In all of the foregoing embodiments of my invention, it will be observed that, in one form or another, fluid under pressure supplied to the control pipe is balanced against brake cylinder pressure in determining the operation of the application insuring means. If the brake cylinder pressure materializes to the proper degree, in the desired time, the active parts of the insuring means are maintained in a biased or "balanced" position, but in the event that the brake cylinder pressure fails to materialize properly the "balance" is not maintained and an emergency application results.

While I have described several embodiments of my invention, and have illustrated each by a specific construction, it is not my intention to be limited to the particular devices or arrangements shown, nor otherwise than by the spirit and scope of the appended claims.

Having now described my invention, what I claim as new and desire to secure by Letters Patent, is:

1. In a vehicle brake system, in combination, a brake equipment comprising a control pipe to which fluid under pressure is supplied to effect a straight air application of the brakes and also comprising a normally charged pipe in which the pressure of fluid is varied to effect an automatic application of the brakes, means responsive to control pipe pressure for effecting after a predetermined delayed interval of time a variation of pressure in said charged pipe, and means responsive to the degree of application of the brakes and operable to prevent said variation in charged pipe pressure when the degree of application attains a given value before the elapse of said predetermined interval of time.

2. In a vehicle brake system, in combination, a control pipe to which fluid under pressure is supplied to effect a straight air application of the brakes, a normally charged pipe in which the pressure of fluid is decreased to effect an automatic application of the brakes, means responsive to a supply of fluid under pressure to said control pipe for effecting after a predetermined delayed interval of time a reduction of pressure in said charged pipe, and means responsive to the actual degree of application of the brakes for inhibiting the operation of said last means when the degree of application attains a chosen value before the elapse of said predetermined interval of time.

3. In a vehicle brake system, in combination, a brake cylinder, a control pipe, a brake pipe, means responsive to the supply of fluid under pressure to said control pipe to effect a supply of fluid under pressure to said brake cylinder corresponding to the degree of pressure established in said control pipe, means responsive to a reduction of pressure in said brake pipe for effecting a supply of fluid under pressure to said brake cylinder to a degree corresponding to the degree of reduction in brake pipe pressure, means responsive to control pipe pressure for effecting after a predetermined delayed interval of time a reduction of pressure in said brake pipe, and means responsive to fluid at brake cylinder pressure for inhibiting the operation of said last means when brake cylinder pressure attains within said predetermined interval of time a value corresponding substantially to control pipe pressure.

4. In a vehicle brake system, in combination, a brake cylinder, a control pipe to which fluid under pressure is supplied to effect a supply of fluid under pressure to said brake cylinder, a brake pipe in which the pressure of fluid is reduced to also effect a supply of fluid under pressure to said brake cylinder, and means including a valve device subject to both fluid at control pipe pressure and fluid at brake cylinder pressure, and operable in the event that brake cylinder pressure fails to materialize to a chosen degree within a predetermined length of time, following supply of fluid under pressure to said control pipe, to effect a reduction of pressure in said brake pipe.

5. In a vehicle brake system, in combination, a brake cylinder, a control pipe to which fluid under pressure is supplied to effect a supply of fluid under pressure to said brake cylinder by straight air operation, a normally charged pipe in which the pressure of fluid is reduced to effect a supply of fluid under pressure to said brake cylinder by automatic operation, a valve device subject both to control pipe pressure and to brake cylinder pressure, and means associated with said valve device for causing it to operate after a predetermined length of time, following supply of fluid under pressure to said control pipe, to effect a reduction of pressure in said normally charged pipe in the event that brake cylinder pressure fails to attain a chosen value within a predetermined length of time.

6. In a vehicle brake system, in combination, a brake cylinder, a control pipe to which fluid under pressure is supplied to effect a straight air application of the brakes, means responsive to the supply of fluid under pressure to said control pipe to effect a supply of fluid under pressure to said brake cylinder, a normally charged pipe, means responsive to the reduction of pressure in said normally charged pipe for also effecting a supply of fluid under pressure to said brake cylinder, and valve means subject to both control pipe pressure and brake cylinder pressure and operative upon a predetermined differential between control pipe pressure and brake cylinder pressure to effect a reduction of pressure in said normally charged pipe.

7. In a vehicle brake system, in combination, a brake cylinder, a control pipe, a brake pipe, electropneumatic means responsive to control pipe pressure for effecting a supply of fluid under pressure to said brake cylinder to a degree corresponding to the pressure established in said control pipe, means responsive to reduction of pressure in said brake pipe for effecting a supply of fluid under pressure to said brake cylinder corresponding to the degree of reduction in brake pipe pressure, a valve device subject to both control pipe pressure and brake cylinder pressure and operative when control pipe pressure is greater than brake cylinder pressure by a predetermined differential to effect a reduction of pressure in said brake pipe, and means for delaying the response of said valve device to control pipe pressure.

8. In a vehicle brake system, in combination, a brake cylinder, a control pipe to which fluid under pressure is supplied to effect a straight air application of the brakes, a normally charged pipe in which the pressure of fluid is reduced to effect an automatic application of the brakes, a valve device having a movable means subject on one side to fluid at control pipe pressure and on the other side to fluid at brake cylinder pressure, and operable when control pipe pressure exceeds brake cylinder pressure by a predetermined differential to open a communication between said normally charged pipe and the atmosphere, and means for delaying the response of said movable means to the establishment of control pipe pressure.

9. In a vehicle brake system, in combination, a brake cylinder, a control pipe to which fluid under pressure is supplied to effect a supply of fluid under pressure to said brake cylinder by straight air operation, a normally charged pipe in which the pressure of fluid is reduced to effect a supply of fluid under pressure to said brake cylinder by automatic operation, a valve device comprising a first movable abutment subject to control pipe pressure and a second movable abutment subject to brake cylinder pressure, said valve device also having a valve shiftable to establish communication between said normally charged pipe and the atmosphere, and also having means interconnecting said two movable abutments and operable when control pipe pressure exceeds brake cylinder pressure by a predetermined differential to cause shifting of said valve, and a choke device and timing reservoir for delaying the response of said first movable abutment to control pipe pressure.

10. In a vehicle brake system, in combination, a brake cylinder, a control pipe to which fluid under pressure is supplied to effect a supply of fluid under pressure to said brake cylinder by straight air operation, a normally charged brake pipe in which the pressure of fluid is reduced to effect a supply of fluid under pressure to said brake cylinder by automatic operation, an automatic valve device operable upon an emergency rate of reduction in brake pipe pressure to effect a supply of fluid under pressure to said brake cylinder, and means including a valve device subject to both control pipe pressure and brake cylinder pressure and operable upon the failure of brake cylinder pressure to materialize to a predetermined degree within a chosen length of time, following supply of fluid under pressure to said control pipe, to effect an emergency rate of reduction in brake pipe pressure to effect an emergency application of the brakes.

11. In a vehicle brake system, in combination, a brake cylinder, a control pipe to which fluid under pressure is supplied to effect a supply of fluid under pressure to said brake cylinder by straight air operation, a brake pipe in which the pressure of fluid is reduced to effect a supply of fluid under pressure to said brake cylinder by automatic operation, valve means subject to both control pipe pressure and brake cylinder pressure, a timing reservoir, said valve means being operable in a normally biased position to connect said timing reservoir to a source of supply of fluid under pressure, and operable when control pipe pressure exceeds brake cylinder pressure by a predetermined differential to connect said timing reservoir to the atmosphere through a restricted communication, and a valve device operable when timing reservoir pressure has reduced below a predetermined value to effect a reduction of pressure in said brake pipe.

12. In a vehicle brake system, in combination, a brake cylinder, a control pipe to which fluid under pressure is supplied to effect a supply of fluid under pressure to said brake cylinder by straight air operation, a brake pipe in which the pressure of fluid is reduced to effect a supply of fluid under pressure to said brake cylinder by automatic operation, valve means subject to both control pipe pressure and brake cylinder pressure and operable in a normally biased position to connect said timing reservoir to a source of supply of fluid under pressure, and operable in response to control pipe pressure to connect said timing reservoir to the atmosphere through a restricted communication, and a vent valve device operable when timing reservoir pressure has reduced below a predetermined value to effect a reduction of pressure in said brake pipe, said valve means being operable in response to a rise of brake cylinder pressure in a given length of time to disconnect said timing reservoir from the atmosphere and to reconnect said timing reservoir to said source of supply to prevent the reduction of pressure in said brake pipe.

13. In a vehicle brake system, in combination, a brake cylinder, means for effecting a supply of fluid under pressure to said brake cylinder by straight air operation, means including a switch device having a chamber normally charged with fluid under pressure and operative upon a reduction of pressure in said chamber below a predetermined value to effect a supply of fluid under pressure to said brake cylinder by automatic operation, means operative during straight air operation to effect said predetermined reduction of pressure in said chamber in a chosen length of time, and means operative also during straight air operation to maintain the pressure in said chamber above said predetermined value in the event that brake cylinder pressure attains said predetermined value before the elapse of said chosen time.

14. In a vehicle brake system, in combination, a brake cylinder, means for supplying fluid under pressure to said brake cylinder by straight air operation, means including a switch device having a chamber normally charged with fluid under pressure and operative upon a predetermined reduction of pressure in said chamber to effect a supply of fluid under pressure to said brake cylinder by automatic operation, means operative to reduce the pressure in said chamber when effecting a straight air application of the brakes, and means operative to maintain the pressure in said chamber substantially at brake cylinder pressure during straight air applications of the brakes.

15. In a vehicle brake system, in combination, a brake cylinder, a control pipe, means for effecting a supply of fluid under pressure to said control pipe to effect an application of the brakes, means responsive to the pressure of fluid supplied to said control pipe for effecting a supply of fluid under pressure to said brake cylinder, a reservoir normally charged with fluid under pressure, a switch device having a chamber subject to the pressure of fluid in said reservoir and operable upon a decrease of pressure in said chamber below a predetermined value for effecting a supply of fluid under pressure to said brake cylinder by automatic operation, means responsive to the pressure of fluid supplied to said control pipe for slowly reducing the pressure of fluid in said reservoir and in said switch chamber, said means being so constructed and arranged as to require a definite interval of time in which to reduce the pressure in said switch chamber to said predetermined value, and means operative in the event that brake cylinder pressure attains a value equal to or greater than said predetermined value within said definite interval of time to maintain the pressure in said switch chamber above said predetermined value to prevent the supply of fluid under pressure to the brake cylinder by said automatic operation.

16. In a vehicle brake system, in combination, a brake cylinder, a control pipe to which fluid under pressure is supplied to effect a supply of fluid under pressure to said brake cylinder by straight air operation, a brake pipe in which the pressure of fluid is reduced to effect a supply of fluid under pressure to said brake cylinder by automatic operation, a valve device having a movable abutment subject on one side to pressure of fluid in said control pipe and on the other side to fluid at brake cylinder pressure, said valve device being normally biased to a given position and being operable when control pipe pressure exceeds brake cylinder pressure by a predetermined differential to be actuated to an operative position, means responsive to movement of said valve device to said operative position for effecting a reduction of pressure in said brake pipe, and means for delaying the response of said movable abutment to control pipe pressure.

17. In a vehicle brake system, in combination, a brake cylinder, a control pipe to which fluid under pressure is supplied to effect a supply of fluid under pressure to said brake cylinder by straight air operation, a brake pipe in which the pressure of fluid is reduced to effect a supply of fluid under pressure to said brake cylinder by automatic operation, an interlock valve device having a piston subject on one side to control pipe pressure and on the other side to brake cylinder pressure, a vent valve device operable upon a supply of fluid under pressure thereto to effect a reduction in brake pipe pressure, said interlock valve device being operative when control pipe pressure exceeds brake cylinder pressure by a predetermined differential to effect a supply of fluid under pressure to said vent valve device, and timing means for delaying the response to said interlock valve device to control pipe pressure.

18. In a vehicle brake system, in combination, a brake equipment comprising a normally discharged pipe to which fluid under pressure is supplied when effecting a service application of the brakes and also comprising a normally charged pipe in which the pressure of fluid is varied to effect an automatic application of the brakes, means responsive to the pressure supplied to said normally discharged pipe for effecting after a predetermined delayed interval of time a variation of pressure in said charged pipe, and means responsive to the degree of a service application of the brakes and operative to prevent said variation in charged pipe pressure when the degree of a service application attains the desired value before the elapse of said predetermined interval of time.

19. In a vehicle brake system, in combination, a normally charged pipe in which the pressure of fluid is decreased to effect an automatic application of the brakes, means for establishing a regulatory fluid pressure to effect an application of the brakes by other than operation of said automatic means, means responsive to said regulatory pressure for effecting after a predetermined delayed interval of time a reduction of pressure in said charged pipe, and means responsive to the actual degree of application of the brakes caused by said regulatory pressure for inhibiting the operation of said last named means when the degree of application attains a chosen value before the elapse of said predetermined interval of time.

20. In a vehicle brake system, in combination, a brake cylinder, means for establishing a control pressure to effect a supply of fluid under pressure to said brake cylinder, a brake pipe in which the pressure of fluid is reduced to also effect a supply of fluid under pressure to said brake cylinder, and means including a valve device subject to both said control pressure and fluid at brake cylinder pressure, and operable in the event that brake cylinder pressure fails to materialize to a chosen degree within a predetermined length of time, following the establishment of said control pressure, to effect a reduction of pressure in said normally charged pipe.

21. In a vehicle brake system, in combination, a service automatic valve device operable to establish a control pressure to effect a service application of the brakes, means including a normally charged pipe operable upon an emergency reduction of pressure in said pipe to effect an emergency application of the brakes, and means including a valve device governed both by the degree of said control pressure and the actual degree of application of the brakes for effecting operation of said emergency means in the event that the actual degree of application of the brakes fails to materialize to a chosen degree within a predetermined interval of time following the establishment of said control pressure by said service automatic valve device.

ELLIS E. HEWITT.